United States Patent
Wei et al.

(10) Patent No.: US 12,432,497 B2
(45) Date of Patent: Sep. 30, 2025

(54) WIRELESS AUDIO MONITORING METHOD AND WIRELESS AUDIO SYSTEM

(71) Applicant: SHANGHAI WUQI MICROELECTRONICS CO., LTD., Shanghai (CN)

(72) Inventors: Ren Wei, Shanghai (CN); Da Liu, Shanghai (CN)

(73) Assignee: SHANGHAI WUQI MICROELECTRONICS CO., LTD., Shanghai (CN)

( * ) Notice: Subject to any disclaimer, the term of this patent is extended or adjusted under 35 U.S.C. 154(b) by 17 days.

(21) Appl. No.: 18/572,060

(22) PCT Filed: Oct. 24, 2022

(86) PCT No.: PCT/CN2022/127058
§ 371 (c)(1),
(2) Date: Dec. 19, 2023

(87) PCT Pub. No.: WO2023/082983
PCT Pub. Date: May 19, 2023

(65) Prior Publication Data
US 2024/0236568 A1    Jul. 11, 2024

(30) Foreign Application Priority Data
Nov. 12, 2021 (CN) .......................... 202111340912.X

(51) Int. Cl.
*H04R 3/12* (2006.01)
*H04R 3/00* (2006.01)
(Continued)

(52) U.S. Cl.
CPC .............. *H04R 3/12* (2013.01); *H04R 3/005* (2013.01); *H04W 12/122* (2021.01); *H04W 76/15* (2018.02)

(58) Field of Classification Search
CPC ........ H04R 3/12; H04R 3/005; H04R 25/552; H04R 25/554; H04W 12/122;
(Continued)

(56) References Cited

U.S. PATENT DOCUMENTS

2012/0058727 A1* 3/2012 Cook ....................... H04R 5/04
455/41.3
2018/0184234 A1* 6/2018 Chen ..................... H04W 76/14
(Continued)

FOREIGN PATENT DOCUMENTS

CN    111386717 A    7/2020
CN    111698794 A    9/2020
(Continued)

OTHER PUBLICATIONS

International Search Report issued Jan. 17, 2023 in connection with PCT/CN2022/127058.
(Continued)

*Primary Examiner* — Yogeshkumar Patel
(74) *Attorney, Agent, or Firm* — Amster, Rothstein & Ebenstein LLP

(57) ABSTRACT

A wireless audio monitoring method and a wireless audio system. The wireless audio monitoring method includes: establishing a first communication link between a primary audio device and a sound source device, so that the primary audio device acquires characteristic parameters of the sound source device; using, by the primary audio device, the characteristic parameters of the sound source device to masquerade as the sound source device and become a pseudo sound source device; establishing a second communication link between the pseudo sound source device and a secondary audio device, so that the secondary audio device acquires communication parameters of the first communication link; and monitoring, by the secondary audio device,
(Continued)

the first communication link according to the communication parameters of the first communication link. The secondary audio device can acquire part of information in the communication parameters of the first communication link when the second communication link is established.

8 Claims, 2 Drawing Sheets

(51) Int. Cl.
*H04W 12/122* (2021.01)
*H04W 76/15* (2018.01)

(58) Field of Classification Search
CPC ....... H04W 76/15; H04W 4/80; H04W 12/02; H04W 12/03; H04W 4/008; H04W 76/14; H04W 84/20; H04W 24/08
See application file for complete search history.

(56) References Cited

U.S. PATENT DOCUMENTS

| | | | |
|---|---|---|---|
| 2019/0174557 A1* | 6/2019 | Ueda | H04R 3/12 |
| 2020/0374820 A1* | 11/2020 | Srivastava | H04L 5/0055 |
| 2021/0219360 A1* | 7/2021 | Ferrari | H04R 25/554 |
| 2022/0312167 A1* | 9/2022 | Gong | H04L 1/1864 |

FOREIGN PATENT DOCUMENTS

| | | |
|---|---|---|
| CN | 112291678 A | 1/2021 |
| CN | 114071438 A | 2/2022 |
| WO | 2021121289 A1 | 6/2021 |

OTHER PUBLICATIONS

Written Opinion issued Jan. 17, 2023 in connection with PCT/CN2022/127058.

\* cited by examiner

WIRELESS AUDIO MONITORING METHOD AND WIRELESS AUDIO SYSTEM

CROSS-REFERENCE TO RELATED APPLICATIONS

This application is a U.S. national stage entry under 35 U.S.C. § 371 of PCT International Patent Application No. PCT/CN2022/127058, filed Oct. 24, 2022, which claims priority to Chinese Patent Application No. CN 202111340912.X, filed Nov. 12, 2021, the contents of each of which are incorporated herein by reference in their entirety.

TECHNICAL FIELD

The present invention relates to the field of communication technologies, in particular to a wireless audio monitoring method and a wireless audio system.

BACKGROUND

A left-right dual-channel wireless audio device has two audio devices (one primary and one secondary) so as to create a stereoscopic and full sound field effect. Due to the characteristics of the Bluetooth Piconet, a point-to-point communication mechanism is mainly adopted between devices; to guarantee that both the two audio devices in the dual-channel wireless audio device can receive audio data sent by a sound source device, two methods are commonly used: 1. the sound source device sends the audio data to a primary audio device first, and then the primary audio device sends the audio data to a secondary audio device; 2. the sound source device sends the audio data to the primary audio device, and the secondary audio device acquires the audio data through monitoring a communication link between the sound source device and the primary audio device.

By the above first method, the audio data need to be forwarded many times, which not only can cause an increase in power consumption of the devices but can lead to a problem of data delay and unsynchronization existing between the two audio devices, thereby causing poor user experience. By the second method, the problem of data delay and unsynchronization existing between the two audio devices can be effectively avoided, but the primary audio device needs to send communication parameters (including a Bluetooth address, a Bluetooth clock, a link security key and the like of the sound source device) of a communication link established between the primary audio device and the sound source device so that the secondary audio device can enter a monitoring mode according to the communication parameters to acquire the audio data. However, the communication parameters of the communication link generally have a large data volume and usually can be transmitted through a plurality of data packets, namely multiple Bluetooth interactions. Thus, if the communication parameters of the communication link are completely sent by the primary audio device to the secondary audio device, the secondary audio device cannot rapidly enter a monitoring mode.

DISCLOSURE OF THE INVENTION

The present invention aims to provide a wireless audio monitoring method and a wireless audio system. A primary audio device can masquerade as a sound source device to establish a connection with a secondary audio device so that the secondary audio device can quickly acquire communication parameters of a link between the primary audio device and the sound source device, thereby rapidly entering a monitoring mode.

To achieve the above goal, the present invention is implemented by the technical solution below:

A wireless audio monitoring method is applied to a dual-channel wireless audio device. The dual-channel wireless audio device includes a primary audio device and a secondary audio device; and the wireless audio monitoring method includes:

establishing a first communication link between the primary audio device and a sound source device, so that the primary audio device acquires characteristic parameters of the sound source device;

using, by the primary audio device, the characteristic parameters of the sound source device to masquerade as the sound source device and become a pseudo sound source device;

establishing a second communication link between the pseudo sound source device and the secondary audio device, so that the secondary audio device acquires communication parameters of the first communication link; and monitoring, by the secondary audio device, the first communication link according to the communication parameters of the first communication link.

Preferably, the establishing of a first communication link between the primary audio device and a sound source device, so that the primary audio device acquires characteristic parameters of the sound source device includes:

initiating, by the sound source device, a connection to the primary audio device; and responding, by the primary audio device, to the connection initiated by the sound source device to establish the first communication link; the sound source device being a master node of the first communication link, and the primary audio device being a slave node of the first communication link.

Preferably, the establishing of a first communication link between the primary audio device and a sound source device, so that the primary audio device acquires characteristic parameters of the sound source device includes:

initiating, by the primary audio device, a connection to the sound source device;

responding, by the sound source device, to the connection initiated by the primary audio device to establish an initial communication link; the primary audio device being a master node of the initial communication link, and the sound source device being a slave node of the initial communication link; and carrying out role switching between the primary audio device and the sound source device in the initial communication link to establish the first communication link; the sound source device being a master node of the first communication link, and the primary audio device being a slave node of the first communication link.

Preferably, the characteristic parameters of the sound source device include communication parameters of the first communication link and the Bluetooth protocol and application-layer parameters of the sound source device; and the communication parameters of the first communication link include the Bluetooth address and the Bluetooth clock of the sound source device, the logical transport address of the primary audio device and the security key of the first communication link.

Preferably, the establishing of a first communication link between the primary audio device and a sound source device, so that the primary audio device acquires characteristic parameters of the sound source device also includes:
acquiring, by the primary audio device, communication parameters of the first communication link when the first communication link is established; and
acquiring, by the primary audio device, the Bluetooth protocol and application-layer parameters of the sound source device through the first communication link after the first communication link has been established.

Preferably, the using of the characteristic parameters of the sound source device by the primary audio device to masquerade as the sound source device and become a pseudo sound source device includes:
using, by the primary audio device, the Bluetooth address, the Bluetooth clock, the Bluetooth protocol and the application-layer parameters of the sound source device to become the pseudo sound source device;
inheriting, by the pseudo sound source device, the logical transport address of the primary audio device and the security key of the first communication link;
configuring, by the pseudo sound source device, the Bluetooth address of the sound source device as a Bluetooth address thereof and configuring the Bluetooth clock of the sound source device as an initial Bluetooth clock thereof; and
adjusting, by the pseudo sound source device, the initial Bluetooth clock according to a preset clock offset to obtain an actual Bluetooth clock of the pseudo sound source device.

Preferably, the establishing of a second communication link between the pseudo sound source device and the secondary audio device, so that the secondary audio device acquires communication parameters of the first communication link includes:
initiating, by the pseudo sound source device, a connection to the secondary audio device;
responding, by the secondary audio device, to the connection initiated by the pseudo sound source device to establish the second communication link;
acquiring, by the secondary audio device, the Bluetooth address and the actual Bluetooth clock of the pseudo sound source device and the logical transport address of the primary audio device when the second communication link is established; the actual Bluetooth clock of the pseudo sound source device being an initial Bluetooth clock of the secondary audio device;
acquiring, by the secondary audio device, the security key of the first communication link through the second communication link after the second communication link has been established; and
adjusting, by the secondary audio device, the initial Bluetooth clock according to the preset clock offset to obtain an actual Bluetooth clock of the secondary audio device; the actual Bluetooth clock of the secondary audio device being the same as the Bluetooth clock of the sound source device.

Preferably, the monitoring of the first communication link by the secondary audio device according to the communication parameters of the first communication link includes:
disusing, by the pseudo sound source device, the characteristic parameters of the sound source device to revert to the primary audio device;
sending, by the sound source device, encrypted audio data to the primary audio device through the first communication link;
monitoring, by the secondary audio device, the first communication link according to the Bluetooth address and the Bluetooth clock of the sound source device and the logical transport address of the primary audio device to acquire the encrypted audio data; and
decrypting, by the secondary audio device, the encrypted audio data according to the security key of the first communication link to acquire audio data.

Preferably, the preset clock offset is not less than 5 Bluetooth time slots, and each Bluetooth time slot is 625 μs.

On the other hand, the present invention further provides a wireless audio system, including a sound source device and a dual-channel wireless audio device; and the dual-channel wireless audio device adopts the above-mentioned wireless audio monitoring method.

The present invention has the following beneficial effects:
according to the wireless audio monitoring method and the wireless audio system provided by the present invention, the primary audio device can acquire and use characteristic parameters of the sound source device through the first communication link to masquerade as the sound source device; and the primary audio device masquerading as the sound source device becomes the pseudo sound source device and establishes a connection with the secondary audio device so that the secondary audio device can quickly acquire communication parameters of the first communication link, thereby rapidly entering a monitoring mode to monitor the first communication link.

In the present invention, the logical transport address assigned by the pseudo sound source device to the secondary audio device is the same as the logical transport address assigned by the sound source device to the primary audio device when the second communication link is established so that the secondary audio device can directly acquire the logical transport address of the primary audio device; meanwhile, the Bluetooth address of the pseudo sound source device is the same as that of the sound source device, and the secondary audio device can acquire part of information in the communication parameters of the first communication link when the second communication link is established so that the secondary audio device can enter a monitoring mode subsequently after acquiring the Bluetooth clock of the sound source device and the security key of the first communication link, thereby greatly shortening the time of the secondary audio device for entering a monitoring mode.

In the present invention, the pseudo sound source device has characteristic parameters of the sound source device, and when implementing establishing the second communication link between the secondary audio device and the pseudo sound source device and acquiring the communication parameters of the first communication link, an original software module on the secondary audio device does not need to be changed too much, thereby having the good applicability and practicability.

BEST IMPLEMENTATIONS OF THE INVENTION

The present invention is described in further detail below in conjunction with the accompanying drawings and the specific embodiments. The advantages and features of the present invention will be more apparent from the following descriptions and claims. It should be noted that the accompanying drawings are in a very simplified form, all use inaccurate scales and are only used to help explain the embodiments of the present invention conveniently and clearly.

Figure 1:
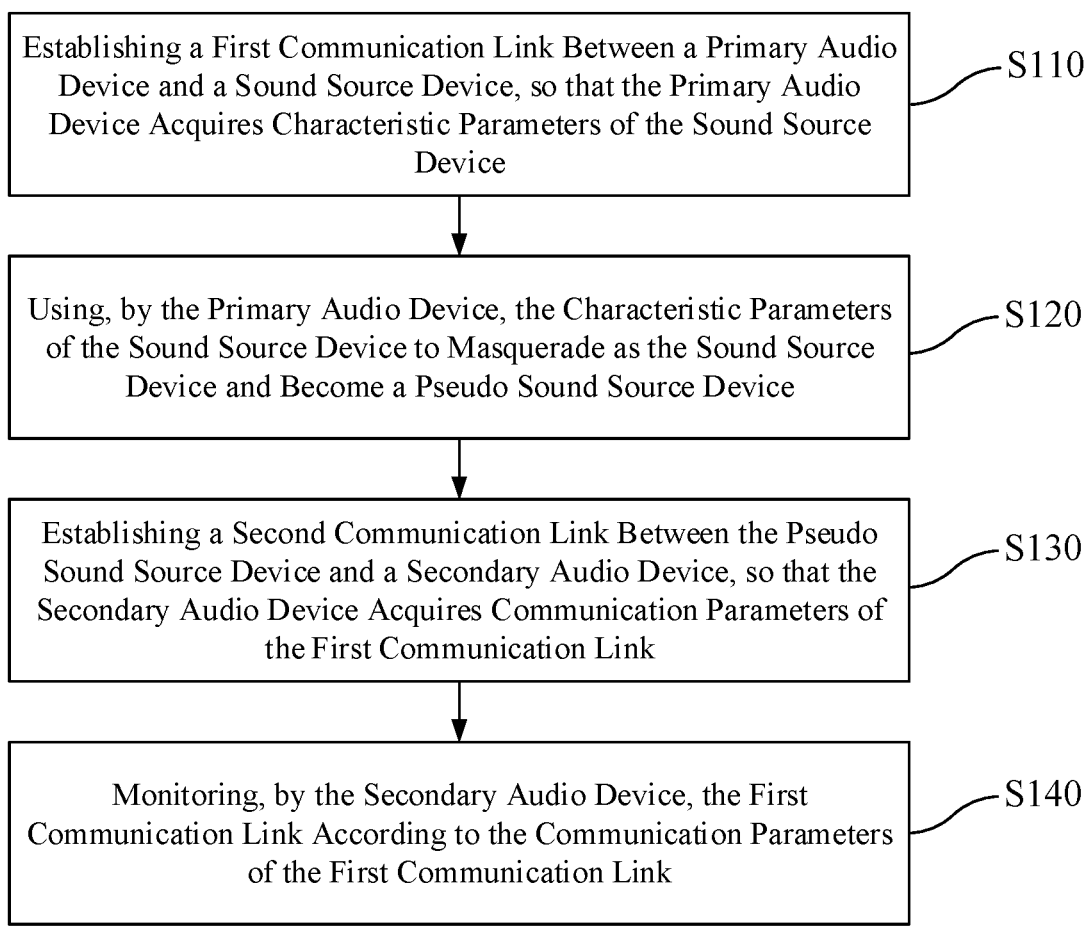
FIG. 1 is a flow diagram of a wireless audio monitoring method according to an embodiment of the present invention.
Figure 2:
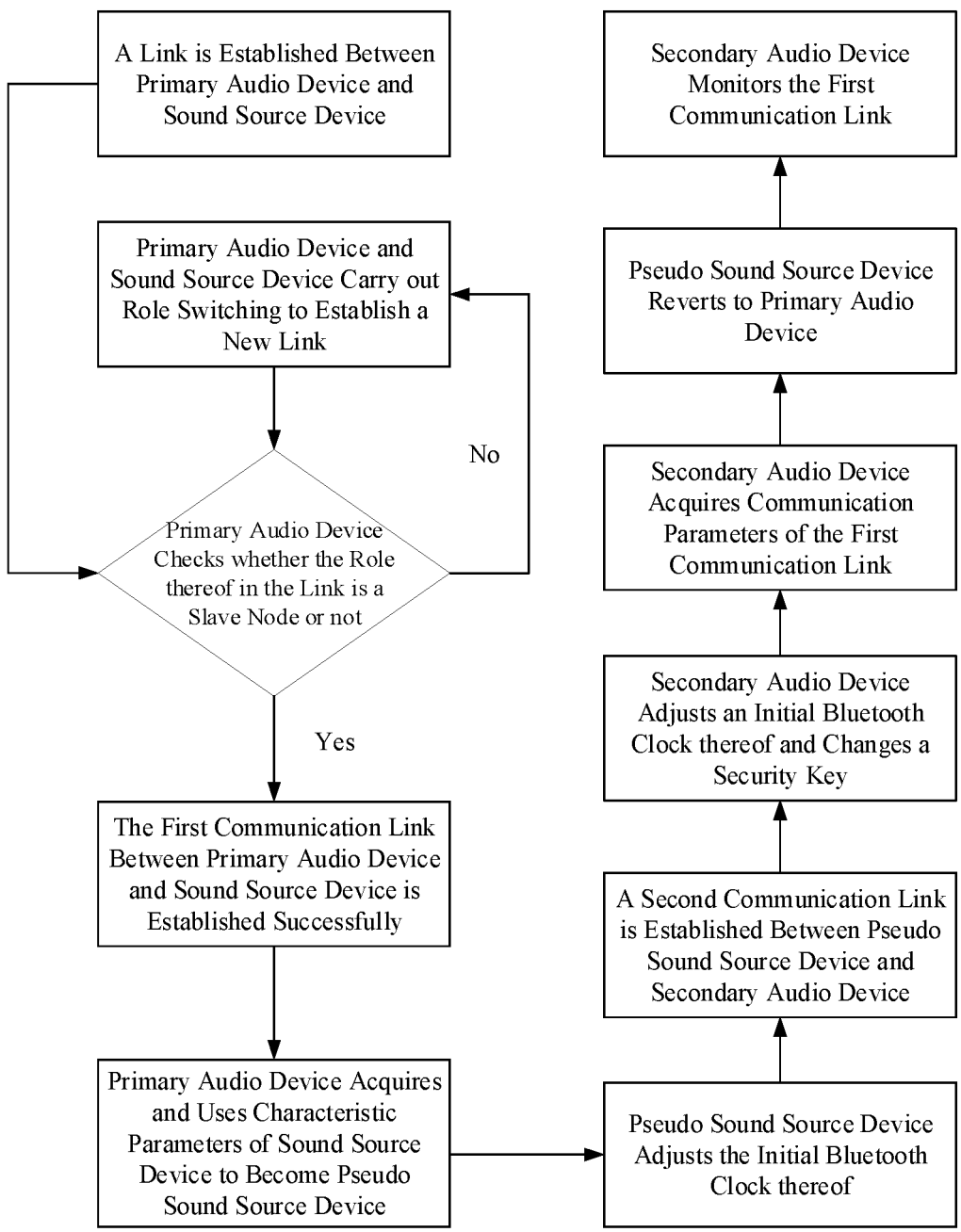
FIG. 2 is a flow diagram of a primary audio device and a secondary audio device in the wireless audio monitoring method according to an embodiment of the present invention.

Referring to FIG. 1 to FIG. 2, the embodiment of the present invention provides a wireless audio monitoring method applied to a dual-channel wireless audio device. The dual-channel wireless audio device includes a primary audio device and a secondary audio device; and the wireless audio monitoring method includes: Step S110, establishing a first communication link between the primary audio device and a sound source device, so that the primary audio device acquires characteristic parameters of the sound source device; Step S120, using, by the primary audio device, the characteristic parameters of the sound source device to masquerade as the sound source device and become a pseudo sound source device; Step S130, establishing a second communication link between the pseudo sound source device and the secondary audio device, so that the secondary audio device acquires communication parameters of the first communication link; and Step S140, monitoring, by the secondary audio device, the first communication link according to the communication parameters of the first communication link.

Referring to both FIG. 1 and FIG. 2, Step S110 includes: initiating, by the sound source device, a connection to the primary audio device; and responding, by the primary audio device, to the connection initiated by the sound source device to establish the first communication link; the sound source device being a master node of the first communication link, and the primary audio device being a slave node of the first communication link.

It's understandable that in some other embodiments, Step S110 includes: initiating, by the primary audio device, a connection to the sound source device; responding, by the sound source device, to the connection initiated by the primary audio device to establish an initial communication link; the primary audio device being a master node of the initial communication link, and the sound source device being a slave node of the initial communication link; and carrying out role switching between the primary audio device and the sound source device in the initial communication link to establish the first communication link; the sound source device being a master node of the first communication link, and the primary audio device being a slave node of the first communication link.

Specifically, based on characteristics of the Bluetooth Piconet, when the first communication link is established between the primary audio device and the sound source device, one side initiating the connection is the master node of the first communication link, and the other side responding to the connection is the slave node of the first communication link. Because a Bluetooth clock of the master node is usually adopted as a clock of the Bluetooth Piconet, a Bluetooth clock of the slave node will be automatically configured as the Bluetooth clock of the master node in the process of establishing the first communication link so that the first communication link can be established successfully, but the present invention is not limited to this.

In this embodiment, the clock of the first communication link may adopt the Bluetooth clock of the sound source device, the master node of the first communication link needs to be the sound source device, and the slave node of the first communication link needs to be the primary audio device. Because both the sound source device and the primary audio device can initiate a connection when a link is established between the primary audio device and the sound source device, the primary audio device can check the role thereof in the link after the link is established so as to ensure that the first communication link is established successfully, the sound source device is the master node of the first communication link and the primary audio device is the slave node of the first communication link. More specifically, after the link between the primary audio device and the sound source device is established, if the primary audio device checks the role thereof in the link to be a slave node, it means that the first communication link is established successfully, the link is the first communication link, the primary audio device is the slave node of the first communication link, and the sound source device is the master node of the first communication link. If the primary audio device checks the role thereof in the link to be a master node, it means that the first communication link is not established successfully, the link is the initial communication link, the primary audio device is the master node of the initial communication link, and the sound source device is the slave node of the initial communication link; subsequently, the primary audio device can request to carry out role switching with the sound source device so as to establish a new link between the primary audio device and the sound source device; after the new link is formed, i.e., after the primary audio device and the sound source device complete role switching, the primary audio device checks the role thereof in the new link, at the moment, the primary audio device will check the role thereof in the new link to be a slave node, it means that the first communication link is established successfully, the new link is the first communication link, the primary audio device is the slave node of the first communication link, and the sound source device is the master node of the first communication link.

Please refer to both FIG. 1 and FIG. 2, and the characteristic parameters of the sound source device comprise communication parameters of the first communication link and the Bluetooth protocol and the application-layer (profile) parameters of the sound source device; the communication parameters of the first communication link comprise the Bluetooth address and the Bluetooth clock of the sound source device, the logical transport address of the primary audio device and the security key of the first communication link.

It's understandable that in some other embodiments, Step S110 further comprises: acquiring, by the primary audio device, communication parameters of the first communication link when the first communication link is established; and acquiring, by the primary audio device, a Bluetooth protocol and application-layer parameters of the sound source device through the first communication link after the first communication link has been established.

Specifically, in the embodiment, the primary audio device and the sound source device will interact with each other (for example, broadcasting, scanning, paging, initiating connections, responding to connections, role switching, etc.) when the first communication link is established; in the interacting process of the primary audio device and the sound source device, the primary audio device can automatically acquire communication parameters of the first communication link, namely the Bluetooth address and the Bluetooth clock of the sound source device, the logical transport address of the primary audio device and the security key of the first communication link; wherein the logical transport address of the primary audio device may be assigned by the sound source device to the primary audio device, and the security key of the first communication link may be co-produced by the sound source device and the primary audio device. More specifically, after the primary audio device acquires the Bluetooth protocol and the application-layer parameter of the sound source device through the first communication link, the primary audio device completely acquires the characteristic parameters of the sound source device, but the present invention is not limited to this.

Please refer to both FIG. 1 and FIG. 2, and Step S120 includes: using, by the primary audio device, the Bluetooth address, the Bluetooth clock, the Bluetooth protocol and the application-layer parameters of the sound source device to become the pseudo sound source device; inheriting, by the pseudo sound source device, the logical transport address of the primary audio device and the security key of the first communication link; configuring, by the pseudo sound source device, the Bluetooth address of the sound source device as a Bluetooth address thereof and configuring the Bluetooth clock of the sound source device as an initial Bluetooth clock thereof; and adjusting, by the pseudo sound source device, the initial Bluetooth clock according to a preset clock offset to obtain an actual Bluetooth clock of the pseudo sound source device.

In some embodiments, the preset clock offset is not less than 5 Bluetooth time slots, and each Bluetooth time slot is 625 µs.

Specifically, in the embodiment, after completely inheriting the characteristic parameters of the sound source device, the primary audio device can apply the characteristic parameters of the sound source device to itself to masquerade as the sound source device; the primary audio device masquerading as the sound source device becomes the pseudo sound source device, and the pseudo sound source device has the same Bluetooth address, bluetooth protocol and application-layer parameters as the sound source device, and the initial Bluetooth clock of the pseudo sound source device is the same as the Bluetooth clock of the sound source device; meanwhile, the pseudo sound source device can directly inherit the logical transport address of the primary audio device and the security key of the first communication link to completely have the characteristic parameters of the sound source device, but the present invention is not limited to this.

Specifically, in the embodiment, after the primary audio device becomes the pseudo sound source device, the sound source device can still have radio frequency-related activities; because the initial Bluetooth clock of the pseudo sound source device is the same as the Bluetooth clock of the sound source device, the pseudo sound source device and the sound source device may conflict or interfere with each other easily. Therefore, the pseudo sound source device can adjust the initial Bluetooth clock thereof according to the preset clock offset to enable the adjusted actual Bluetooth clock of the pseudo sound source device to be different from the Bluetooth clock of the sound source device, thereby avoiding conflicts or interference between the pseudo sound source device and the sound source device. More specifically, because a longest BT packet is the 5 Bluetooth time slots (SLOT), the preset clock offset should not be less than the 5 Bluetooth time slots, but the present invention is not limited to this.

Please refer to both FIG. 1 and FIG. 2, and Step S130 includes: initiating, by the pseudo sound source device, a connection to the secondary audio device; responding, by the secondary audio device, to the connection initiated by the pseudo sound source device to establish the second communication link; acquiring, by the secondary audio device, the Bluetooth address and the actual Bluetooth clock of the pseudo sound source device and the logical transport address of the primary audio device when the second communication link is established; the actual Bluetooth clock of the pseudo sound source device being an initial Bluetooth clock of the secondary audio device; acquiring, by the secondary audio device, the security key of the first communication link through the second communication link after the second communication link has been established; and adjusting, by the secondary audio device, the initial Bluetooth clock according to the preset clock offset to obtain an actual Bluetooth clock of the secondary audio device; the actual Bluetooth clock of the secondary audio device being the same as the Bluetooth clock of the sound source device.

Specifically, in the embodiment, the secondary audio device periodically enters a connectable state to wait for the pseudo sound source device to initiate the connection and make a response, thereby completing the establishment of the second communication link. When the second communication link is established, the pseudo sound source device and the secondary audio device will also interact (for example, broadcasting, scanning, paging, initiating connections, responding to connections, etc.); in the interacting process of the pseudo sound source device and the secondary audio device, the secondary audio device can automatically acquire communication parameters of the second communication link, namely the Bluetooth address and the actual Bluetooth clock of the pseudo sound source device, the logical transport address of the secondary audio device and the security key of the second communication link. More specifically, because the Bluetooth protocol and application-layer parameters of the pseudo sound source device are the same as the Bluetooth protocol and the application-layer parameters of the sound source device, in the process of establishing the second communication link, the logical transport address assigned by the pseudo sound source device to the secondary audio device is the same as the logical transport address assigned by the sound source device to the primary audio device so that the secondary audio device can directly acquire the logical transport address of the primary audio device. At the same time, because the Bluetooth address of the pseudo sound source device is the same as the Bluetooth address of the sound source device, in the process of establishing the second communication link, the secondary audio device can acquire part of information in the communication parameters of the first communication link, namely the Bluetooth address of the sound source device and the logical transport address of the primary audio device so that the secondary audio device can enter a monitoring mode subsequently after acquiring the Bluetooth clock of the sound source device and the security key of the first communication link, but the present invention is not limited to this.

Specifically, in the embodiment, based on the encryption property of Bluetooth, the security key of the first communication link is co-produced by the sound source device and the primary audio device, and the security key of the second communication link is co-produced by the pseudo sound source device and the secondary audio device; because information of the secondary audio device is different from information of the primary audio device, the security key of the second communication link is different from the security key of the first communication link, and the pseudo sound source device can send the security key of the first communication link to the secondary audio device through the second communication link, so that the secondary audio device obtains the security key of the first communication link. After the secondary audio device obtains the security key of the first communication link, the pseudo sound source device can send a request for changing the security key to the secondary audio device, and the secondary audio device changes the security key of the second communication link to the security key of the first communication link so that the secondary audio device can correctly decode information transmitted on the first communication link, but the present invention is not limited to this.

Specifically, in the embodiment, because the initial Bluetooth clock of the secondary audio device is the same as the actual Bluetooth clock of the pseudo sound source device and there is a difference of the preset clock offset between the actual Bluetooth clock of the pseudo sound source device and the Bluetooth clock of the sound source device, the secondary audio device can adjust the initial Bluetooth clock thereof according to the preset clock offset, the adjusted actual Bluetooth clock of the secondary audio device is the same as the Bluetooth clock of the sound source device, at the moment, the secondary audio device completely acquires the communication parameters of the first communication link and can monitor the first communication link, but the present invention is not limited to this.

Please refer to both FIG. 1 and FIG. 2, and Step S140 includes: disusing, by the pseudo sound source device, the characteristic parameters of the sound source device to revert to the primary audio device; sending, by the sound source device, encrypted audio data to the primary audio device through the first communication link; monitoring, by the secondary audio device, the first communication link according to the Bluetooth address and the Bluetooth clock of the sound source device and the logical transport address of the primary audio device to acquire the encrypted audio data; and decrypting, by the secondary audio device, the encrypted audio data according to the security key of the first communication link to acquire audio data.

Specifically, in the embodiment, after the pseudo sound source device reverts to the primary audio device, the second communication link between the secondary audio device and the pseudo sound source device can be disconnected automatically, but the present invention is not limited to this.

The present embodiment further provides a wireless audio system, including a sound source device and a dual-channel wireless audio device; and the dual-channel wireless audio device adopts the above-mentioned wireless audio monitoring method.

In summary, according to the wireless audio monitoring method and the wireless audio system provided in the present invention, the first communication link is established between the primary audio device and the sound source device; the primary audio device can acquire and use characteristic parameters of the sound source device through the first communication link to masquerade as the sound source device; and the primary audio device masquerading as the sound source device becomes the pseudo sound source device and establishes the second communication link with the secondary audio device so that the secondary audio device can quickly acquire communication parameters of the first communication link, thereby rapidly entering a monitoring mode to monitor the first communication link. In the embodiment, in the process of establishing the second communication link, the logical transport address assigned by the pseudo sound source device to the secondary audio device is the same as the logical transport address assigned by the sound source device to the primary audio device so that the secondary audio device can directly acquire the logical transport address of the primary audio device; meanwhile, the Bluetooth address of the pseudo sound source device is the same as the Bluetooth address of the sound source device, in the process of establishing the second communication link, the secondary audio device can acquire part of information in the communication parameters of the first communication link so that the secondary audio device can enter a monitoring mode subsequently after acquiring the Bluetooth clock of the sound source device and the security key of the first communication link, thereby greatly shortening the time of the secondary audio device for entering a monitoring mode.

While the contents of the present invention have been described in detail by the foregoing preferred embodiments, it should be understood that the aforementioned descriptions should not be considered limiting to the present invention. Various modifications and substitutions of the present invention will be apparent to those skilled in the art after they read the aforementioned contents. Therefore, the scope of the present invention should be limited by the appended claims.

What is claimed is:

1. A wireless audio monitoring method applied to a dual-channel wireless audio device, the dual-channel wireless audio device comprising a primary audio device and a secondary audio device, wherein the wireless audio monitoring method comprises:
   establishing a first communication link between the primary audio device and a sound source device, so that the primary audio device acquires characteristic parameters of the sound source device; the sound source device being a master node of the first communication link, and the primary audio device being a slave node of the first communication link;
   using, by the primary audio device, the characteristic parameters of the sound source device to masquerade as the sound source device and become a pseudo sound source device;
   establishing a second communication link between the pseudo sound source device and the secondary audio device, so that the secondary audio device acquires communication parameters of the first communication link; and
   disusing, by the pseudo sound source device, the characteristic parameters of the sound source device to revert to the primary audio device;
   monitoring, by the secondary audio device, the first communication link according to the communication parameters of the first communication link;
   the characteristic parameters of the sound source device comprise communication parameters of the first communication link and a Bluetooth protocol and application-layer parameters of the sound source device; the communication parameters of the first communication link comprise a Bluetooth address and a Bluetooth clock of the sound source device, a logical transport address of the primary audio device and a security key of the first communication link;

the using of the characteristic parameters of the sound source device by the primary audio device to masquerade as the sound source device and become a pseudo sound source device comprises:
using, by the primary audio device, the Bluetooth address, the Bluetooth clock, the Bluetooth protocol and the application-layer parameters of the sound source device to become the pseudo sound source device;
inheriting, by the pseudo sound source device, the logical transport address of the primary audio device and the security key of the first communication link;
configuring, by the pseudo sound source device, the Bluetooth address of the sound source device as a Bluetooth address thereof and configuring the Bluetooth clock of the sound source device as an initial Bluetooth clock thereof; and
adjusting, by the pseudo sound source device, the initial Bluetooth clock according to a preset clock offset to obtain an actual Bluetooth clock of the pseudo sound source device.

2. The wireless audio monitoring method according to claim 1, wherein the establishing of a first communication link between the primary audio device and a sound source device, so that the primary audio device acquires characteristic parameters of the sound source device comprises:
initiating, by the sound source device, a connection to the primary audio device; and
responding, by the primary audio device, to the connection initiated by the sound source device to establish the first communication link; the sound source device being a master node of the first communication link, and the primary audio device being a slave node of the first communication link.

3. The wireless audio monitoring method according to claim 1, wherein the establishing of a first communication link between the primary audio device and a sound source device, so that the primary audio device acquires characteristic parameters of the sound source device comprises:
initiating, by the primary audio device, a connection to the sound source device;
responding, by the sound source device, to the connection initiated by the primary audio device to establish an initial communication link; the primary audio device being a master node of the initial communication link, and the sound source device being a slave node of the initial communication link; and
carrying out role switching between the primary audio device and the sound source device in the initial communication link to establish the first communication link; the sound source device being a master node of the first communication link, and the primary audio device being a slave node of the first communication link.

4. The wireless audio monitoring method according to claim 1, wherein the establishing of a first communication link between the primary audio device and a sound source device, so that the primary audio device acquires characteristic parameters of the sound source device further comprises:

acquiring, by the primary audio device, communication parameters of the first communication link when the first communication link is established; and
acquiring, by the primary audio device, the Bluetooth protocol and the application-layer parameters of the sound source device through the first communication link after the first communication link has been established.

5. The wireless audio monitoring method according to claim 1, wherein the establishing of a second communication link between the pseudo sound source device and the secondary audio device, so that the secondary audio device acquires communication parameters of the first communication link comprises:
initiating, by the pseudo sound source device, a connection to the secondary audio device;
responding, by the secondary audio device, to the connection initiated by the pseudo sound source device to establish the second communication link;
acquiring, by the secondary audio device, the Bluetooth address and the actual Bluetooth clock of the pseudo sound source device and the logical transport address of the primary audio device when the second communication link is established; the actual Bluetooth clock of the pseudo sound source device being an initial Bluetooth clock of the secondary audio device;
acquiring, by the secondary audio device, the security key of the first communication link through the second communication link after the second communication link has been established; and
adjusting, by the secondary audio device, the initial Bluetooth clock according to the preset clock offset to obtain an actual Bluetooth clock of the secondary audio device; the actual Bluetooth clock of the secondary audio device being the same as the Bluetooth clock of the sound source device.

6. The wireless audio monitoring method according to claim 5, wherein the monitoring of the first communication link by the secondary audio device according to the communication parameters of the first communication link comprises:
sending, by the sound source device, encrypted audio data to the primary audio device through the first communication link;
monitoring, by the secondary audio device, the first communication link according to the Bluetooth address and the Bluetooth clock of the sound source device and the logical transport address of the primary audio device to acquire the encrypted audio data; and
decrypting, by the secondary audio device, the encrypted audio data according to the security key of the first communication link to acquire audio data.

7. The wireless audio monitoring method according to claim 1, wherein the preset clock offset is not less than 5 Bluetooth time slots, and each Bluetooth time slot is 625 μs.

8. A wireless audio system, comprising a sound source device and a dual-channel wireless audio device, the dual-channel wireless audio device adopting the wireless audio monitoring method according to claim 1.

* * * * *